(12) United States Patent
Meng

(10) Patent No.: US 8,055,419 B2
(45) Date of Patent: Nov. 8, 2011

(54) MULTI-FUNCTIONAL DISPLAY FOR TACHOMETER

(76) Inventor: Jianhao Meng, Riverside, CT (US)

(*) Notice: Subject to any disclaimer, the term of this patent is extended or adjusted under 35 U.S.C. 154(b) by 945 days.

(21) Appl. No.: 11/829,308

(22) Filed: Jul. 27, 2007

(65) Prior Publication Data

US 2009/0030584 A1    Jan. 29, 2009

(51) Int. Cl.
*G06F 19/00* (2011.01)
*G06F 7/00* (2006.01)
*G06F 17/00* (2006.01)

(52) U.S. Cl. .......... 701/64; 340/456; 340/439; 340/441; 340/461; 702/142; 702/145

(58) Field of Classification Search .............. 701/1, 35, 701/36, 51, 54, 61, 64, 70, 99, 200, 211, 701/213, 66, 93, 94, 95, 100, 105, 123; 477/97; 340/425.5, 438, 439, 441, 456, 459, 461, 340/815.4, 670; 116/57, 62.1–62.4, 252, 116/299; 362/489, 491; 322/31; 74/12; 73/1.37, 488; D10/98

See application file for complete search history.

(56) References Cited

U.S. PATENT DOCUMENTS

| 4,841,902 | A  | * | 6/1989  | Gubin ......................... 116/62.4 |
|-----------|----|---|---------|------------------------------------------|
| 5,309,139 | A  | * | 5/1994  | Austin ......................... 340/462 |
| 5,982,168 | A  | * | 11/1999 | Westberg et al. ............. 324/160    |
| 6,341,883 | B1 | * | 1/2002  | Kraxner ........................ 362/489 |
| 6,625,562 | B2 | * | 9/2003  | Hayashi et al. .............. 702/145    |
| 6,781,512 | B2 | * | 8/2004  | Hayashi et al. .............. 340/456    |
| 6,844,811 | B2 | * | 1/2005  | Hayashi et al. .............. 340/441    |
| 2003/0164756 | A1 | * | 9/2003 | Hayashi et al. .............. 340/439   |
| 2004/0093129 | A1 | * | 5/2004 | Majstorovic et al. ............. 701/1  |
| 2006/0017552 | A1 | * | 1/2006 | Andreasen et al. ........... 340/438    |

* cited by examiner

*Primary Examiner* — Jack W Keith
*Assistant Examiner* — Rami Khatib
(74) *Attorney, Agent, or Firm* — Oakwood Law Group, LLP

(57) ABSTRACT

A novel display apparatus and method that enables the operator to shift gears smoothly on motor vehicles is described. The display shows engine revolutions per minute (RPM) at various traveling speeds for any gears all in one dial. The display may also show shifting paths for different driving styles. The static version of the display may be overlaid on top of existing tachometer. The dynamic version of display runs on portable devices with Global Positioning System (GPS) will show optimal RPM and shift indicator continuously. Further, the dynamic display is wireless networked to provide real-time driving instructions.

12 Claims, 3 Drawing Sheets

Shift Paths and Shift Indicator

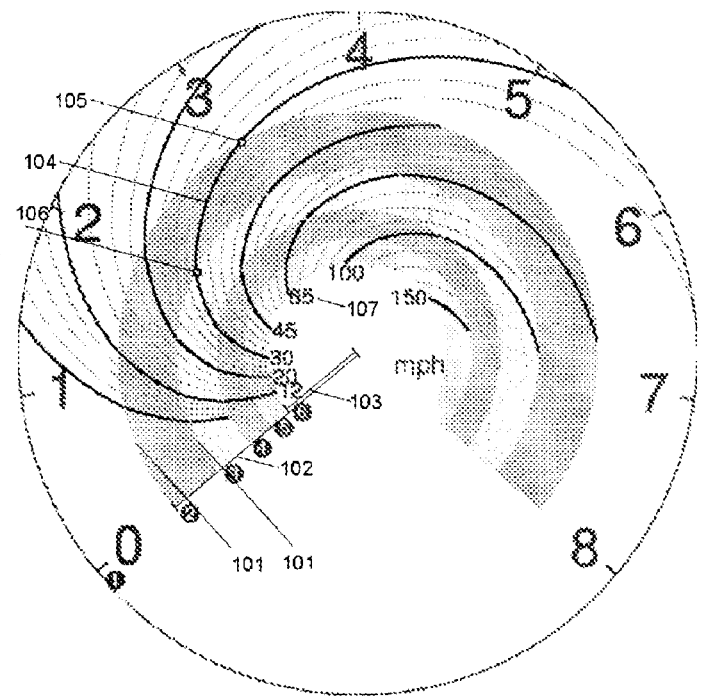
*Figure 1: Tachometer Display with Archimedean Spirals*
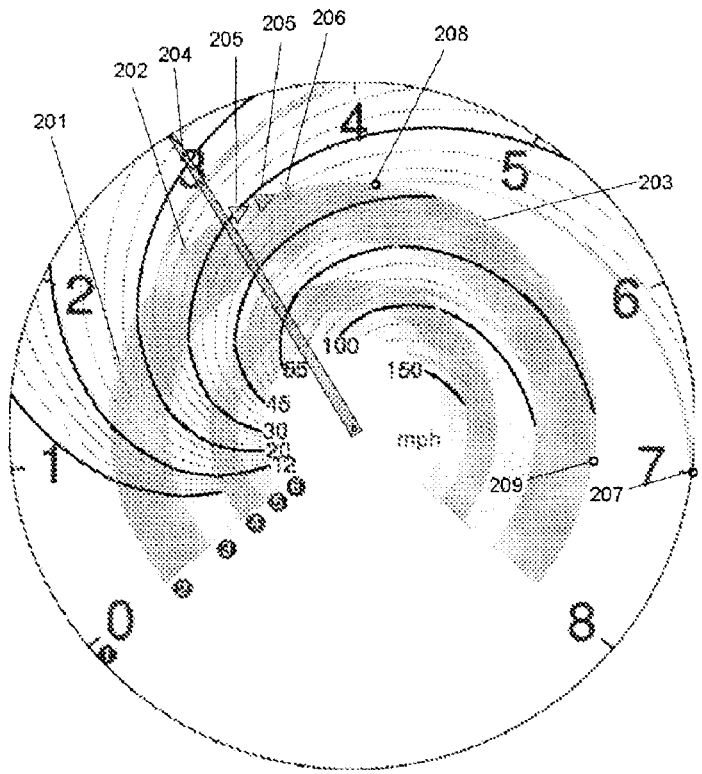
*Figure 2: Shift Paths and Shift Indicator*

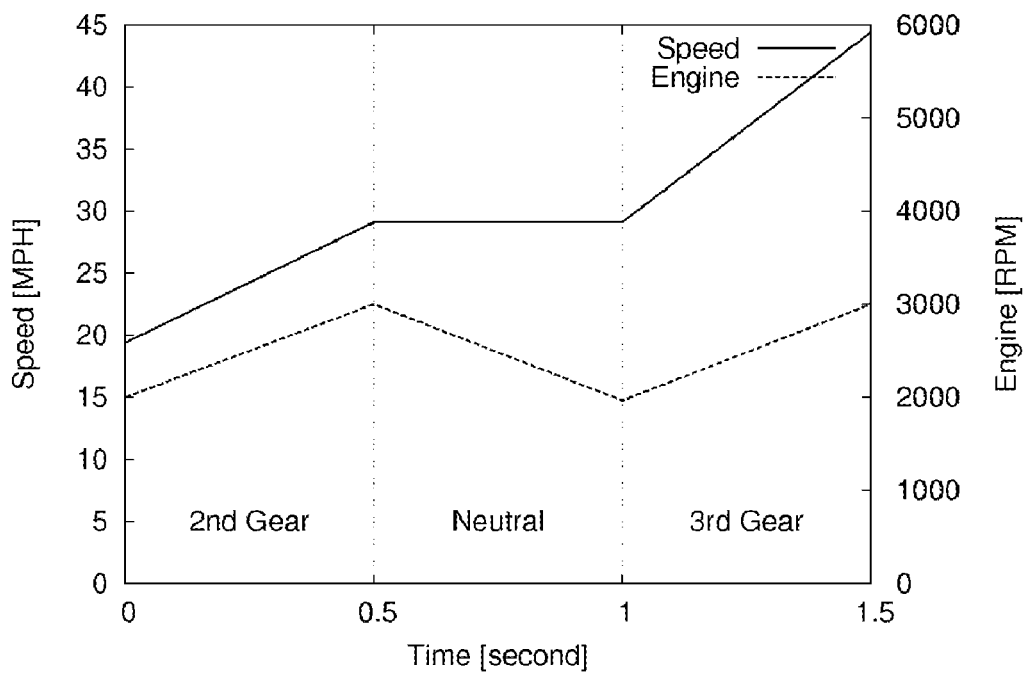
*Figure 3: Speed and RPM during Up Shift*
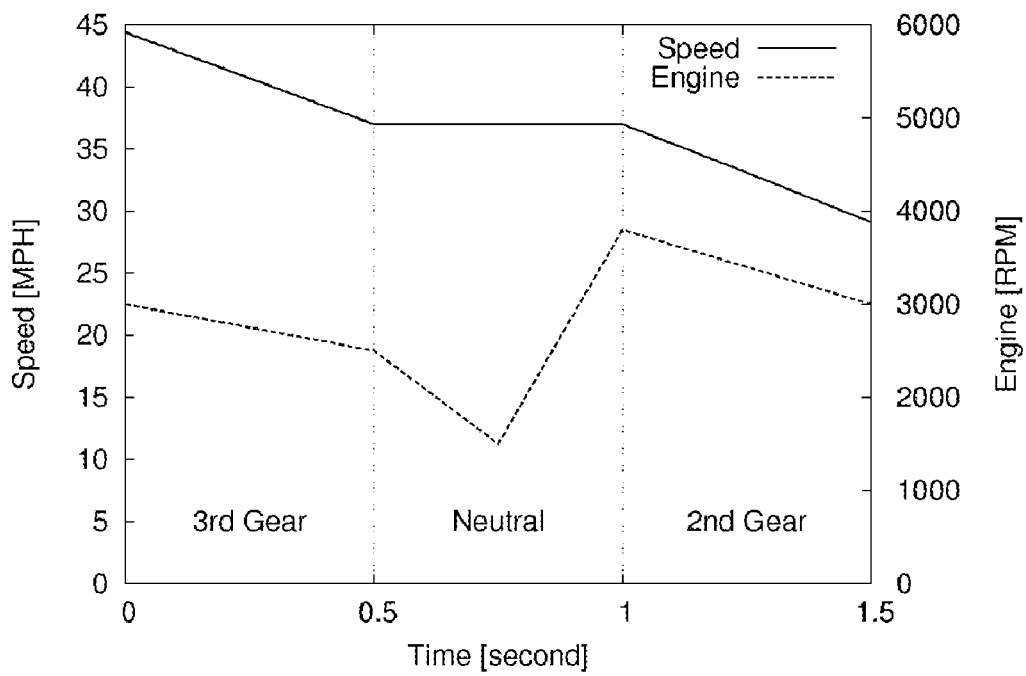
*Figure 4: Speed and RPM during Down Shift*

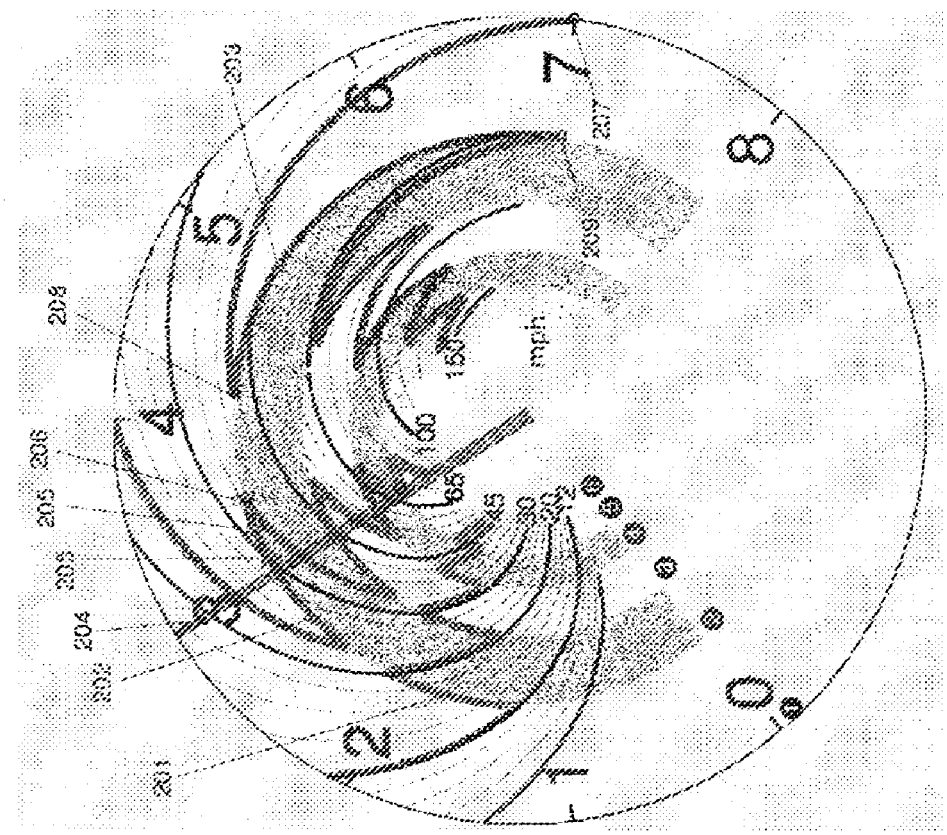
Figure 5: Shift Paths and Shift Indicator

MULTI-FUNCTIONAL DISPLAY FOR TACHOMETER

STATEMENT AS TO RIGHTS TO INVENTIONS MADE UNDER FEDERALLY SPONSORED RESEARCH OR DEVELOPMENT

Not Applicable

BACKGROUND OF THE INVENTION

This invention relates generally to improved instrumentation and driving instructions for shifting gears smoothly on motor vehicles with manual transmission. The display apparatus may also be used when shifting from Neutral to Drive in vehicle with automatic transmission. The improved display is applied to motor vehicles, but it would be recognized that the invention has a much broader range of applicability.

Internal combustion engine as used in modern motor vehicle produces high revolution with low torque. Transmission is used to scale down revolution while scaling up torque. For example, to start the car from stop, the driver would use the first gear which has the highest gear ratio and torque; to cruise at highway speed, the driver would use the highest gear which has the lowest ratio and torque. To change gear with a manual transmission, the driver would release the throttle and simultaneously depress the clutch, then select the desired gear, and release the clutch while depressing the throttle. If the driver releases the clutch too fast or too slow, the motor vehicle might either lurch forward or backward. A smooth shift occurs when the current engine RPM drops or increases to match the future engine RPM after the car is in the desired gears.

A typical tachometer as found in today's motor vehicle displays only the engine RPM at the current gear. The driver has to learn when to shift by feeling and repeated practicing. Since different motor vehicle may carry transmission with different gear ratios, the driver may have to reestablish the feel for smooth shifting when driving a different motor vehicle.

A systematically approach which enables the driver to look up the engine RPM of the future gear is desired.

BRIEF SUMMARY OF THE INVENTION

In order to execute a smooth shift in motor vehicle with manual transmission, it is advantageous for the driver to know the matching engine RPM of a desired gear. The present invention provides a novel apparatus for displaying motor vehicle's engine RPM, vehicle speed, and optimal shifting RPM from the current gear to a desired gear. This invention provides a shift indicator and displays the shifting paths for various driving conditions. Further, the invention is implemented on GPS enabled portable device to provide real-time driving and shifting instructions.

BRIEF DESCRIPTION OF THE DRAWINGS

FIG. 1 is a simplified diagram of the tachometer display according to an embodiment of the present invention.

FIG. 2 is a simplified diagram of the tachometer display with shifting paths and shift indicator.

FIG. 3 is a simplified chart of the motor vehicle speed and engine RPM during a perfect up shift.

FIG. 4 is a simplified chart of the motor vehicle speed and engine RPM during a perfect down shift.

In FIGS. 3 and 4, the plot is simplified to assume shifting delay and frictions/drag are negligible during the shift.

FIG. 5 is a simplified diagram of the tachometer display with shifting paths and shift indicators for economy, performance and racing.

DETAILED DESCRIPTION OF THE INVENTION

The display has concentric arcs 101 that represent a different gear. The radius 102 of each arc is proportional to the gear ratio that the arc represents. This would give the lower numbered gears more display area to show more detailed reading because more torque is exerted on the vehicle in lower gears.

$$r_{i+1} = r_i - radius * center\_range * ratios_i / \Sigma ratios \quad [1]$$

where
   radius is the radius of the tachometer dial, default 2.2 inch
   center_range 103 is the center display area over the total dial area in percentage, default 20%
   $ratios_i$ is the gear ratio of the $i^{th}$ gear
and the initial value $r_i$=radius.

Connecting the arcs are multiple Archimedean spirals 104. One end of the curve is the current RPM 105, and the other end is the optimal shifting RPM of the next gear 106. The curve is derived in a polar coordinate system $(\Theta, t)$ as follows, $$\Theta = \Theta_{j-1} + (\Theta_j - \Theta_{j-1})/(r_{j-1} - r_j) * (r_{j-1} - t) \quad [2]$$

where
   $\Theta_j$ is the angle of the RPM of the $j^{th}$ gear
   $r_j$ is the radius of the arc of the $j^{th}$ gear as given in equation [1]

Each Archimedean spiral also indicates a constant vehicle speed 107. When the final drive ratio and tire size are given, the vehicle speed (miles per hour) can be determined for a given RPM at the highest gear. Further, given the gear ratios at other gears, the vehicle speed for a given RPM at a given gear can be derived as follows, $$speed = RPM/final\_drive\_ratio * 60/63360 * tire\_circ * ratios_N/ratios_i$$

where
   RPM is the engine rotations per minute
   final_drive_ratio is the number of turns of the driving axle for each turn of the engine
   tire_circ is the diameter of the tire mounted on the driving axle, in inches
   60 is for 60 minutes per hour
   63360 is for 63360 inches per mile
   $ratios_N$ is the gear ratio of the highest gear
   $ratios_i$ is the gear ratio of the $i^{th}$ gear The display also indicates multiple shifting paths 201, 202, 203 which consists a set of Archimedean spirals for various driving conditions such as economy 201, performance 202 and racing 203 etc. Each path is comprised of Archimedean spiral from one gear to the other (not necessary in sequential order, e.g. $1^{st}$ gear to $3^{rd}$ gear) and the RPM arcs. The static version of the display may be printed out on transparency and overlaid on top of existing tachometer.

Given a vehicle's performance numbers and the terrain information, the speed at each turn over the entire course can be pre-calculated. The speed at various locations can be translated in terms of gear numbers and RPMs. Thus, when the present invention is implemented on a GPS enabled portable device, the apparatus will display the current RPM needle 204, the optimal gear and RPM speed. If the vehicle is traveling below or above the optimal speed, the display will show the RPM cursors 205 to prompt the operator to speed up or slow down. If a gear shift is necessary, the display will show the shift indicator 206. The shift indicator instructs the operator to shift when the engine RPM hits its mark.

The GPS enabled portable device may also be used to record the location coordinates, the vehicle speed, engine RPM and the gear number etc. data as performed by an experienced driver. Such data may be used to construct the shifting paths using the apparatus in the present invention to train novice drivers.

Further, the GPS enabled portable device may be connected to the network via one of the plural number of wireless protocols. Real-time driving instructions may be given to the vehicle operator either by computer server or human.

A few practical usages of the present invention are given below.

1. Up shift from $2^{nd}$ gear to $3^{rd}$ gear

The operator depresses the clutch and releases the throttle while glancing at the display of present invention to locate the Archimedean spiral which is closest to current RPM 105 on the arc denoted the $2^{nd}$ gear. The RPM will start to decrease. The operator now can visually trace the Archimedean spiral to where it intersects the arc of the $3^{rd}$ gears 106. The operator will now release the clutch and depress the throttle when the engine RPM falls to the RPM as indicated by 106. A simplified RPM and vehicle speed plot is shown in FIG. 3.

2. Down shift from $3^{rd}$ to $2^{nd}$ gear

The operator depresses the clutch and releases the throttle while glancing at the display of present invention to locate the Archimedean spiral which is closest to current RPM 106 on the arc denoted the $3^{nd}$ gear. The RPM will start to decrease. The operator will now visually trace this Archimedean spiral to the arc of the $2^{rd}$ gears 105. The operator will depress the throttle to increase the engine RPM to the number as indicated by 105, then the operator will release the clutch.

3. Shift from Neutral into gear on motor vehicle with automatic transmission

When going downhill, it is sometime advantageous to shift gear to Neutral to reduce the drag from the torque converter to improve fuel efficiency. Engine RPM will fall while the gears are not engaged and the vehicle speed remains high. When the operator puts the vehicle back in Drive mode, the vehicle may be lurched back a bit due to mismatching engine RPM. Using the present invention, the operator may take note of the vehicle speed, say 65 miles per hour (mph) from the speedometer, then locate the closest Archimedean spiral 107 to the current vehicle speed. Depress the throttle to increase the engine RPM to the value indicated by 107, and shift the stick from Neutral to Drive.

4. Drive according to the shifting paths

The operator chooses the style of driving, for example, Racing 203. The operator will depress the throttle to bring the engine RPM to 207, depress clutch and release gas, let the engine RPM drop to 208, release clutch and depress gas to increase the engine RPM to 209 and so on to follow the highlighted shifting paths.

5. Drive with dynamic shift indicator and RPM cursor

The apparatus will continuously update the optimal gear and RPM on the GPS equipped portable device. Should a shift is necessary, the display will show shift indicator 207 and also highlight the shift path from the current gear. If the vehicle is not traveling at the optimal speed, the display will show the RPM cursor 208 to prompt the operator to increase or decrease engine RPM.

I claim:

1. A two dimensional graphical display for indicating optimal shifting RPM of a motor vehicle engine from a current gear to a desired gear comprising:
   a tachometer having a face plate and a pointer that rotates in a clockwise direction as the engine RPM increases;
   concentric arcs on the face of the face plate that represent different gears; and
   multiple Archimedean spirals overlaying the concentric arcs on the face plate;
   wherein when the current RPM of the engine pointer overlays the intersection of the concentric arc of a first gear with an Archimedean spiral then the intersection of that Archimedean spiral with the concentric arc of the next higher gear is the optimal shifting RPM of the next higher gear; and
   wherein each Archimedean spiral indicates a constant vehicle speed.

2. The graphical display of claim 1 wherein a set of Archimedean spirals indicate multiple shifting paths for economy driving.

3. The graphical display of claim 1 wherein a set of Archimedean spirals indicate multiple shifting paths for performance driving.

4. The graphical display of claim 1 wherein a set of Archimedean spirals indicate multiple shifting paths for racing driving.

5. The graphical display of claim 1 wherein a first set of Archimedean spirals indicate multiple shifting paths for economy driving; a second set of Archimedean spirals indicate multiple shifting paths for performance driving; and a third set of Archimedean spirals indicate multiple shifting paths for racing driving.

6. The graphical display of claim 1 wherein the concentric arcs that represent different gears and the multiple spirals that overlay the concentric arcs are printed on transparency and overlaid on top of the tachometer.

7. A method for indicating optimal shifting RPM of a motor vehicle engine from a current gear to a desired gear with a two dimensional display comprises:
   providing a tachometer having a face plate and a pointer that rotates in a clockwise direction as the engine RPM increases;
   providing concentric arcs on the face of the face plate that represent different gears; and
   overlaying multiple Archimedean spirals on the concentric arcs on the face plate;
   wherein when the current RPM of the engine pointer overlays the intersection of the concentric arc of a first gear with an Archimedean spiral then the intersection of that Archimedean spiral with the concentric arc of the next higher gear is the optimal shifting RPM of the next higher gear; and
   wherein each Archimedean spiral indicates a constant vehicle speed.

8. The method of claim 7 wherein a set of Archimedean spirals indicate multiple shifting paths for economy driving.

9. The method of claim 7 wherein a set of Archimedean spirals indicate multiple shifting paths for performance driving.

10. The method of claim 7 wherein a set of Archimedean spirals indicate multiple shifting paths for racing driving.

11. The method of claim 7 wherein a first set of Archimedean spirals indicate multiple shifting paths for economy driving; a second set of Archimedean spirals indicate multiple shifting paths for performance driving; and a third set of Archimedean spirals indicate multiple shifting paths for racing driving.

12. The method of claim 7 wherein the concentric arcs that represent different gears and the multiple spirals that overlay the concentric arcs are printed on transparency and overlaid on top of the tachometer.

* * * * *